March 21, 1944.  E. J. P. JAMES  2,344,875

MACHINE FOR WELDING

Original Filed March 6, 1942    4 Sheets-Sheet 1

INVENTOR
Edmond J. P. James
By Sletto & Hart
ATTORNEYS

March 21, 1944.　　　　E. J. P. JAMES　　　　2,344,875
MACHINE FOR WELDING
Original Filed March 6, 1942　　4 Sheets-Sheet 2

INVENTOR
Edmond J. P. James
BY
Tibbetts & Hart
ATTORNEYS

INVENTOR
Edmond J. P. James
BY
Libbetts & Hart
ATTORNEYS

March 21, 1944.　　　E. J. P. JAMES　　　2,344,875

MACHINE FOR WELDING

Original Filed March 6, 1942　　　4 Sheets-Sheet 4

INVENTOR
Edmond J. P. James
BY Sibbetts & Hart
ATTORNEYS

Patented Mar. 21, 1944

2,344,875

UNITED STATES PATENT OFFICE 2,344,875

MACHINE FOR WELDING

Edmond J. P. James, Akron, Ohio, assignor to Packard Motor Car Company, Detroit, Mich., a corporation of Michigan Original application March 6, 1942, Serial No. 433,664. Divided and this application October 26, 1942, Serial No. 463,309

14 Claims. (Cl. 219—4)

This invention relates to a machine for resistance welding metal work pieces, and is a division of my application Serial No. 433,664, filed March 6, 1942.

An object of the invention is to provide for simultaneously joining two work pieces to remote portions of a third work piece by the same resistance welding operation.

Another object of the invention is to provide a resistance welding machine with pressure controlled conductor means that can be applied to a work piece between the welding electrodes to shift with the work piece as required by dimensional changes occurring during the welding operation.

Another object of the invention resides in providing means for holding a plurality of work pieces on a resistance welding machine so that they will be accurately located during the welding operation.

Other objects of the invention will appear from the following description taken in connection with the drawings, which form a part of this specification, in which.

Figure 1:
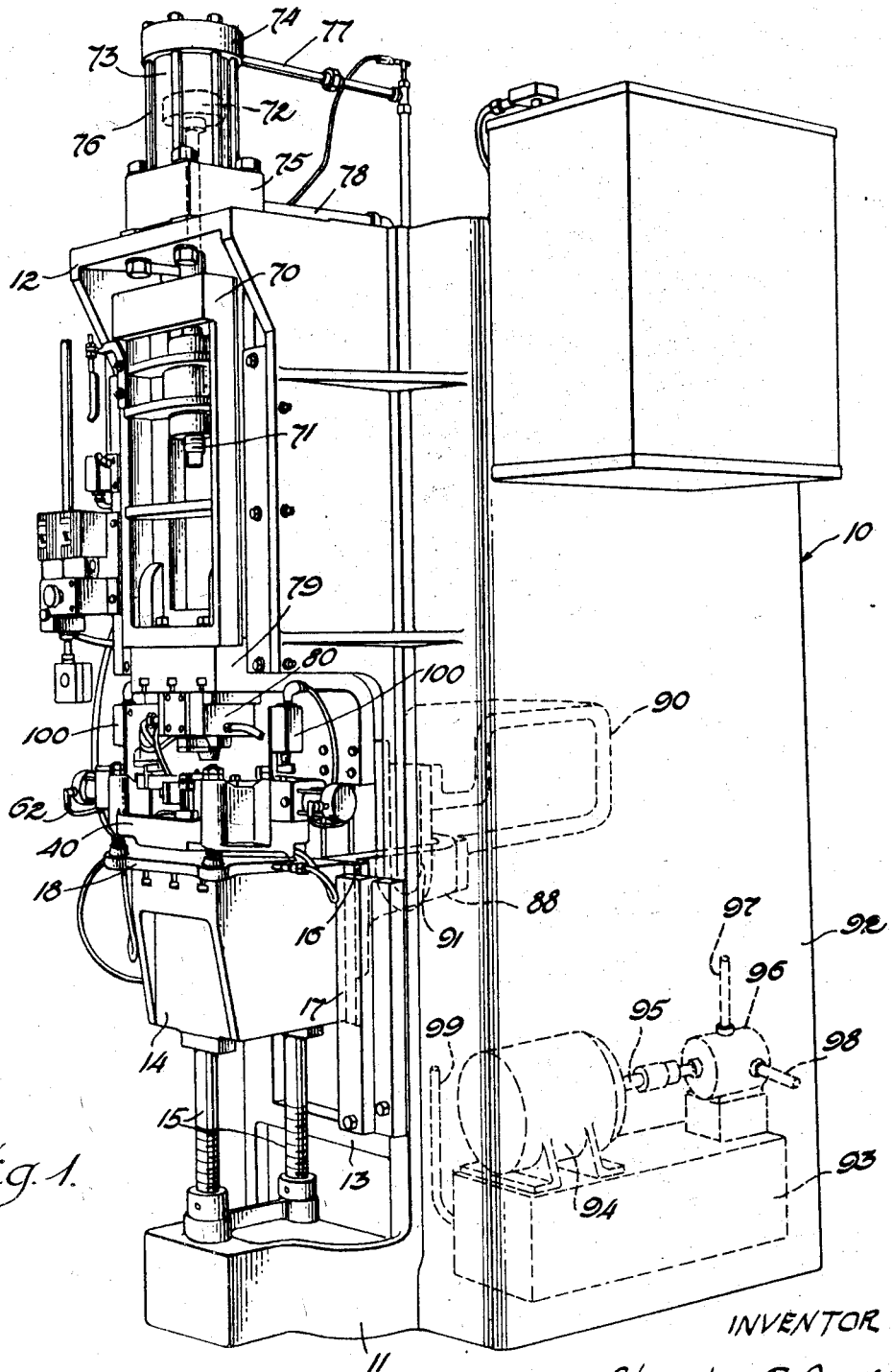
Fig. 1 is a perspective view of a welding machine incorporating the invention.

Referring to the drawings by characters of reference, the welding machine is carried by a supporting frame structure 10 having a base 11, a head 12, and a standard 13. A platform 14 is supported on screw members 15 and the rear wall of the platform is formed with projecting flanges 16 engaged by clamping members 17 attached to the standard. A bed 18 is detachably secured on the platform and has an electrode support 19 projecting therefrom that is threaded to receive a hold-down nut 20 for clamping the flanged base of electrode 21 on the support. Locator 22 extends from the central portion of the upper face of the electrode.

The machine is designed to resistance weld two work pieces to a third work piece simultaneously and at remote points. Such work pieces can comprise two arms 23 and 24 and a journal sleeve 25 joined together as a bell crank in actuator mechanism for shifting the drive through change speed gearing. The arms are formed with openings through their end portions and an end of each arm is welded to the ends of the journal sleeve with the openings aligned with the opening through the sleeve. A locator 26 is fixed to a supporting boss 27 fixed on bed 18 adjacent the electrode support and is in the form of an adjustable threaded rod having a tip portion 28 arranged to pilot in the opening at the end of rod 23 remote from the end engaging locator 22. This locator 26 is screwed into boss 27 and is adjusted to a desired vertical position where it is locked by nut 29. Rod 23 is in fixed position for the welding operation when arranged with its openings piloted on locators 22 and 28.

Figure 2:
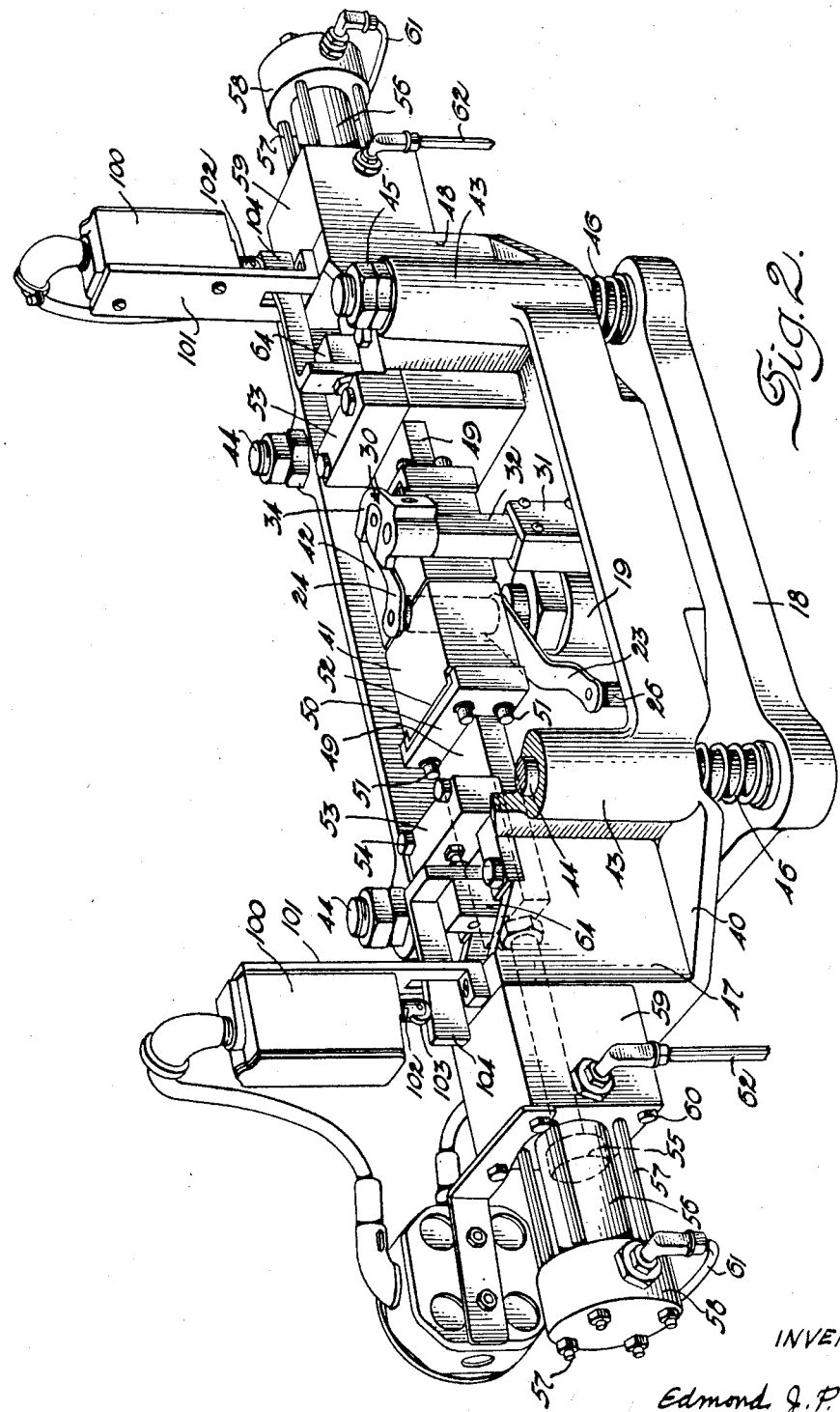
Fig. 2 is a perspective view showing the work pieces mounted on the lower electrode and the locating devices.

The journal sleeve 25 is placed endwise on the end of arm 23 so that the opening therethrough aligns with the opening piloted on the electrode. Arm 24 is then placed on the upper end of the sleeve with the opening in one end aligning with the opening in the sleeve and with the other end resting on a floating locator 30, see Fig. 2. A hollow square standard 31 is fixed on bed 18 adjacent electrode support 19 and carries a locator rod 32 having a shouldered end 33 adapted to pilot in and support the end of arm 24 remote from the sleeve. Guide head 34 is fixed to the shouldered end of rod 32 by a set screw 35 locked by nut 36. Spring 37 is arranged in the hollow standard and supports the locator rod, the rod being limited in its outward movement by a set screw 38 extending into a groove 39 in the locator rod. As the rod corresponds in cross section to the square interior of its standard it can not rotate.

A carrier frame 40 is anchored to and floats above bed 18 for the purpose of supporting a pair of current conductor members 41 and 42 that also serve to locate the sleeve 25. The carrier frame is formed with a plurality of hollow upstanding bosses 43 through which rods 44 extend. These rods are screwed into bed 18 and nuts 45 are applied to the upper ends of the rods to limit upward movement of the carrier frame. Coil springs 46 encircle the rods and extend between the carrier frame and the bed so that the carrier frame is spring mounted and can move vertically.

The ends 47 and 48 of the carrier frame are formed to provide journals for connecting rods 49 having their head ends 50 secured to the conductor members 41 and 42 by bolts 51. Between the head ends 50 and the conductors there is arranged an insulation member 52. Bearing caps 53 are secured to the ends 47 of the carrier frame by bolts 54 and are arranged to fit over the rods 49.

Figure 3:
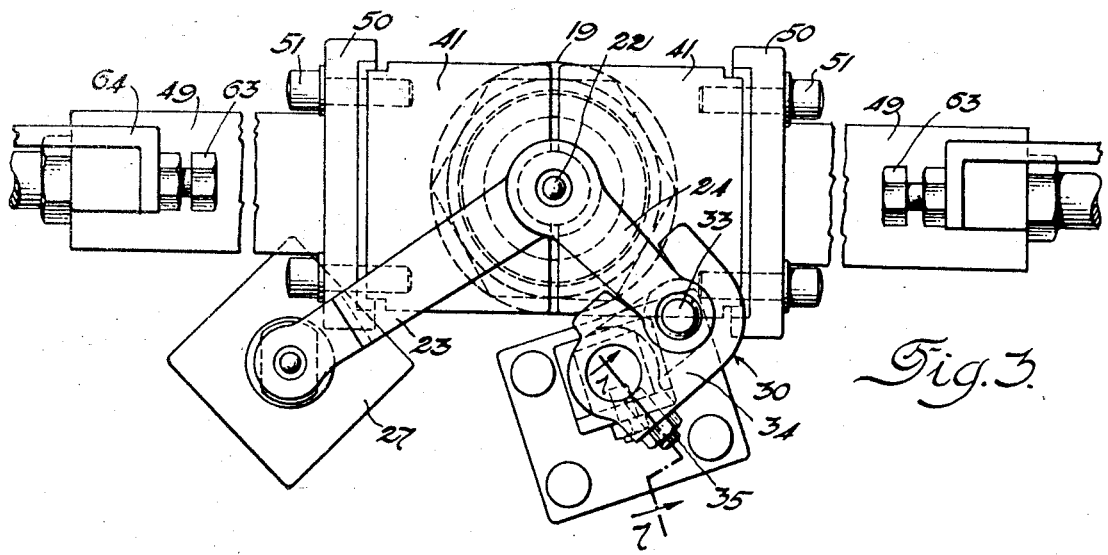
Fig. 3 is a fragmentary plan view of the structure shown in Fig. 2.
Figure 4:
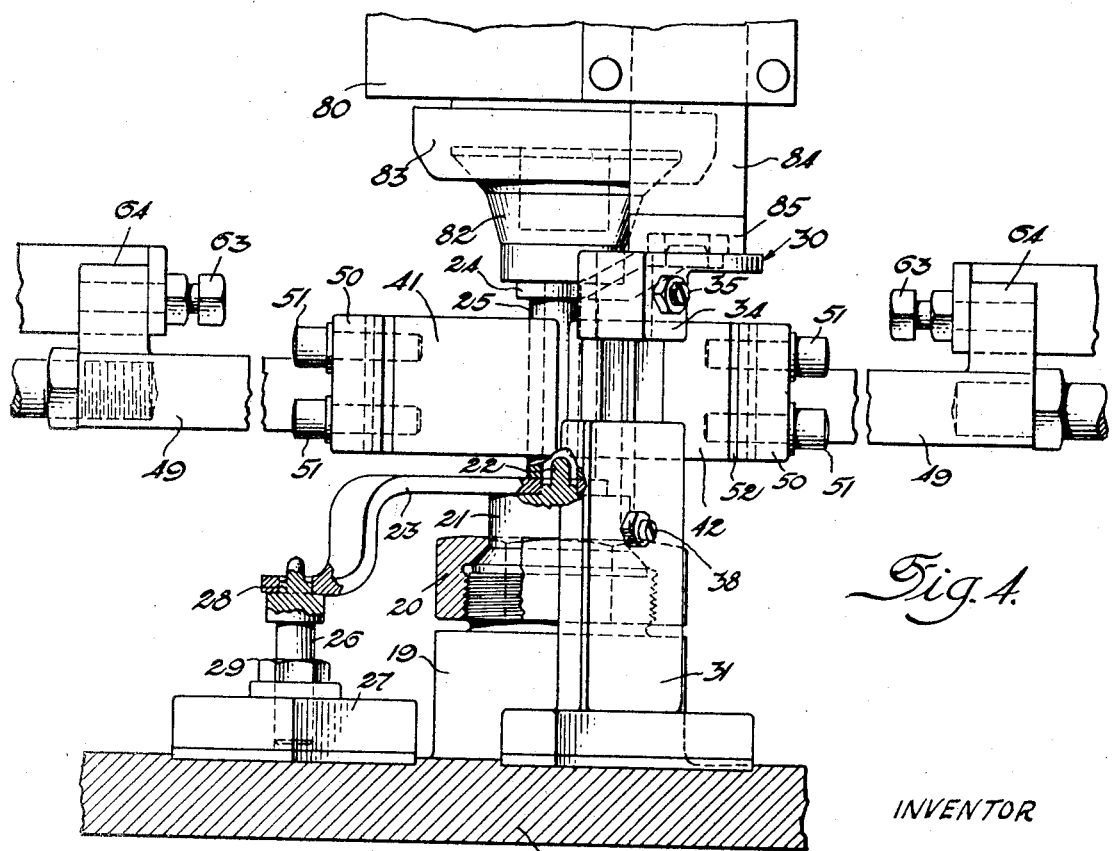
Fig. 4 is an elevational view of the work pieces positioned between the electrodes prior to the welding operation.

The connecting rods 49 carrying the conductors are arranged to be reciprocated by fluid pressure and pistons, as indicated at 55, are secured to the rods. The pistons reciprocate in cylinders 56 and studs 57 extend through cylinder heads 58 to secure them and the cylinders to the cylinder bases 59 which are secured to the end portions 47 and 48 of the carrier frame by bolts 60. Fluid conduits 61 connect with the heads of the cylinders and conduits 62 connect with the bases of the cylinders and through a suitable control, the pistons are caused to reciprocate or to remain in position engaging the conductors with sleeve 25 or remote therefrom. The adjacent conductor faces are formed with semicircular grooves corresponding in radius to the sleeve 25 and are of such dimension that they will engage the sleeve along its length but with sufficient clearance from arms 23 and 24 to allow for a decreased sleeve length during the welding operation. It will be noted that the carrier frame supports the conductors 41 and 42 and the power mechanism for controlling the position of the conductors. The conductors are arranged to have a close fit with the sleeve 25 and they are pressed toward each other against the sleeve with sufficient force to maintain a full contact throughout their adjacent surfaces and thus the conductors will serve to hold the sleeve in proper relation with the arms 22 and 23 during the welding operation. The engaging position of the conductors with the sleeve can be regulated through the adjustment of stop bolts 63 that are fixed to upstanding bosses 64 projecting from rods 49, see Figs. 3 and 4, and engage with bearing caps 53.

The head portion 12 of the machine frame supports the upper electrode above arm 24 when positioned to be welded, as previously described. A frame 70 is mounted in a suitable guideway on a machine frame and is connected by rod 71 with piston 72 arranged in cylinder 73. The cylinder comprises a head 74, a base 75 bolted to the machine head 12 and bolts 76 securing the head and the cylinder to the cylinder base. Fluid pressure conduit 77 leads into the head and another similar conduit 78 leads into the base and the flow of fluid through these conduits is controlled to actuate and position the piston 72 for raising and lowering and applying pressure to the upper electrode. The frame 70 has a bed 79 secured to the lower end thereof and fixed to this bed is a supporting block 80 having a depending threaded reduced portion 81 against which the upper electrode 82 seats and is secured by a cap nut 83 clamping a flanged portion of the electrode against the block 80. The upper electrode is arranged in alignment with the lower electrode 21 and is moved up or down in accordance with suitable controls for the fluid pressure actuating means.

In order to assist the locator 30 in retaining the arm 24 in proper relation during the welding operation, I propose to provide clamping means that is carried by the block 80 to engage and serve this function. A supporting member 84 is suitably fixed to block 80 and has a fiber base 85 secured thereto by bolts 86 and this fiber member is recessed to receive a ring 87 arranged so that the locator tip 33 can pilot therein. As the block 80 is moved downwardly the ring 87 will clamp the end of arm 24 tightly against the shoulder at the end 33 of the locator 30. It will be observed that locator 30 is constructed so that the portions supporting arm 24 can move downwardly during the welding operation to compensate for reduction in the length of sleeve 25. Because of the floating support for the conductors 41 and 42, they can be clamped against the sleeve 25 and can move to accommodate any shift in an axial position of the sleeve 25 during the welding operation. The ends of the sleeve 25 are welded to the contacting ends of arms 23 and 24 by a resistance welding operation through means of alternating current flowing through electrodes 21 and 82. During the welding operation relatively high pressure is applied against the movable electrode 82. The conductors 41 and 42, in addition to locating the work pieces, form part of the circuit by means of which current passes from one end of the sleeve 25 to the other in order to insure a uniform flow between the electrodes in either direction. This type of current flow through a work piece, such as a carbon metal sleeve, becomes irregular and nonuniform without assistance of the conductors herein described and the resulting weld without conductors would not be satisfactory. It will be seen that the ends of the arms are located at the ends of the sleeve and consequently are spaced so that two separate welds are made in each welding operation through the use of one circuit.

The beds 18 and 79 are formed of copper, or some other similar current conducting metal, and such members are connected in any suitable manner with the secondary of transformer 90. Conductor 88 connects the transformer with platform 18 and as the bed 79 is movable up and down it is connected with transformer 90 by flexible copper plates 91 bent in U form. The transformer secondary is contained in a housing 92 at the rear of the machine frame and in this housing is also arranged the power portion of the fluid pressure system that actuates the movable electrode and the conductors. A fluid tank 93 is arranged in the housing and supports an electric motor 94 connected by shaft 95 to a pump contained within housing 96. Supply conduit 97 leads from the pump housing, a conduit 98 leads from the pump housing to the tank and the tank is provided with a return conduit 99 for fluid released from the cylinders. Conduits 97 and 99 are connected with conduits 77 and 78 and with conduits 61 and 62, and the pressure flow through such conduits can be regulated by solenoid valves in a sequence appearing hereinafter.

The welding current is preferably alternating and is controlled to pass through the electrodes, the work pieces and the conductors from the ends of the secondary of transformer 90. The arrangement is preferably such that the conductors will be moved to engage the work piece sleeve prior to the lowering of the upper electrode and a suitable manually operable electric control can be provided for causing actuation of solenoid valves regulating fluid flow to pistons 55 to obtain this result.

As a safety precaution, this fluid control can be arranged in series with the fluid control of the movable electrode and the welding current. Switches 100 are fixed to brackets 101 fixed on the ends 47 and 48 of the carrier. The switches are actuated by rods 102 having rollers 103 arranged to ride on cam actuators 104 fixed to bosses 64 on the rods 49. The cam actuators will move the rods 102 upwardly to close the circuit for the electrodes and the upper electrode fluid system when the conductors are engaged with sleeve 25 for the welding operation.

Figure 5:
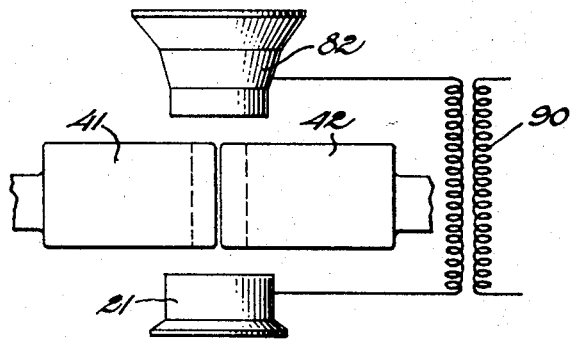
Fig. 5 is a schematic view of the wiring for the electrodes shown in the machine in Figs. 1 to 4.
Figure 6:
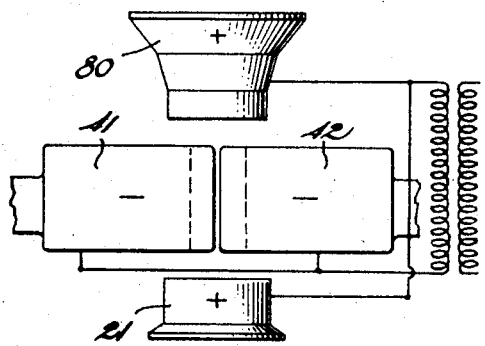
Fig. 6 is another schematic view of a modified form of wiring that may be used.
Figure 7:
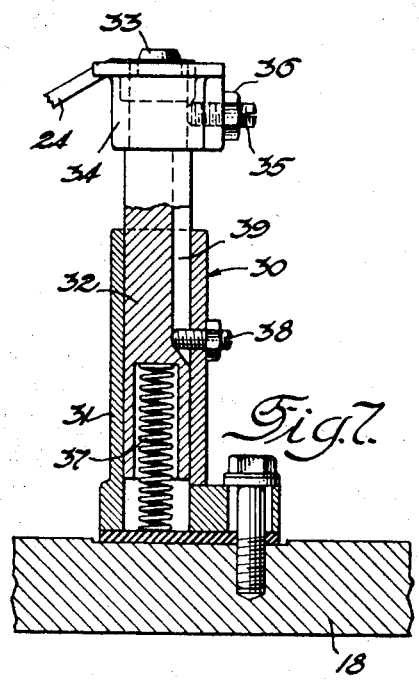
Fig. 7 is a sectional view of the floating locator taken on line 7—7 of Fig. 3.
Figure 8:
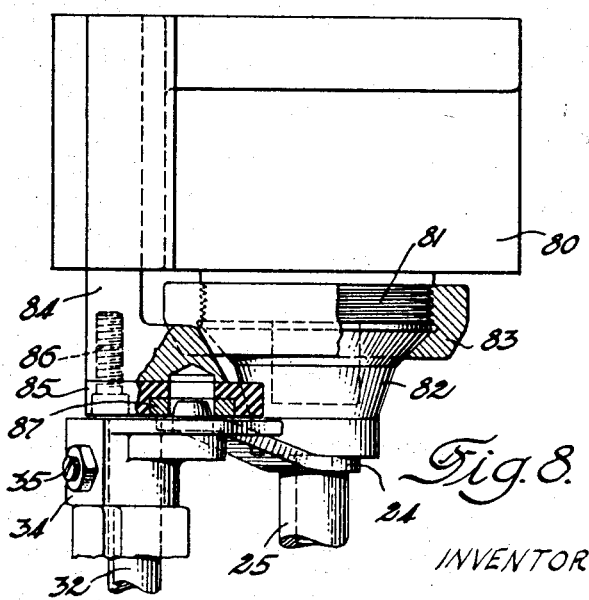
Fig. 8 is a fragmentary elevational view of the upper electrode structure showing the clamping member and the work piece above the floating locator.

After closing switches 101, the upper electrode is moved down in pressure relation with the arm 24 and a suitable solenoid valve can be arranged in the control system for such operation automatically or by a separate manual control. The machine is now ready for the welding operation and the transformer secondary, which is connected at its ends to the electrodes, is energized. Current will flow in a circuit through the arms, lengthwise through the sleeve and through the conductors to resistance weld the arms to the sleeve. The conductors will insure a uniform flow of current between the ends of the sleeve, regardless of direction of flow, and consequently efficient welds will result. This welding circuit is shown schematically in Fig. 5. The transformer can be connected at one end with the electrodes and at the other end with the conductors as shown schematically in Fig. 6. The current is preferably interrupted during the welding operation so that the temperature is raised in stages.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a resistance welding machine, a supporting structure having a head and a stationary bed, an electrode fixed on said bed, a movable electrode carried by the head and cooperating with the fixed electrode to directly engage and apply pressure against work pieces located therebetween, a carrier frame movable in the same direction as said movable electrode, locator members movably mounted on the frame for clamping one of the work pieces in position for welding between the electrodes, and spring means on the bed supporting the carrier frame.

2. In a resistance welding machine, a stationary bed, an electrode fixed on said bed, a movable pressure applying electrode cooperating with the fixed electrode in a welding operation upon work located therebetween, and movable pressure operated locator member for holding a portion of the work between and in alignment with the electrodes.

3. In a welding machine, a supporting structure having a head and a bed, an electrode fixed on said bed, a movable pressure operated electrode carried by the head, conductor members movable normal to the electrodes for clamping work therebetween in position for welding, and a carrier for said conductor members supported on said bed.

4. In a machine for welding a pair of arms to the ends of a sleeve, a stationary electrode, a pressure operated electrode movable toward the stationary electrode, said sleeve being aligned lengthwise between the electrodes with an arm engaging each end thereof, and a pair of power operated members movable to engage and locate said sleeve in position to be welded, said members being movable oppositely and normal to the sleeve axis.

5. In a machine for welding a pair of arms to the ends of a sleeve, a fixed electrode, a power operated electrode, fixed means locating one of the arms on the fixed electrode, means for holding the sleeve in endwise relation on the fixed arm and in axial alignment with the electrodes, and means locating the other arm on the upper end of the sleeve, said sleeve holding means and upper arm locating means being movable vertically to travel with the sleeve and the arm during the welding operation.

6. In a machine for welding a pair of arms to the ends of a sleeve to form a bell crank, a fixed electrode, a power operated electrode, means for holding the arms and sleeve in bell crank relation during the welding operation including a locator for the arm to be engaged by the power operated electrode, and means carried by said power operated electrode cooperating with said locator to clamp the arm engaged by the power operated electrode in position during the welding operation.

7. In a machine for welding a pair of arms to the ends of a sleeve, an electrode fixed on the machine, a power operated electrode mounted on the machine above the fixed electrode, means locating the arms relative to the electrodes, a pair of members locating the sleeve between the arms and in alignment with the electrodes, power means for controlling engagement and disengagement of the members with the sleeve, a carrier frame supporting the members and their controlling power means, and means supporting said carrier frame for shifting movement with the sleeve resulting from decreased length during the welding operation.

8. In a machine for welding a pair of arms to the ends of a sleeve, an electrode fixed on the machine, a power operated electrode mounted on the machine above the fixed electrode, means locating the arms with the sleeve therebetween and in alignment with the electrodes, a pair of opposed members for engaging the sleeve between the arms, a carrier frame having bearings, power operated actuator means for the members operating in said bearings, stop means fixed to the actuator means and engageable with the bearings to limit the movement of the members in the direction of the sleeve, and spring means for mounting said carrier frame on the machine.

9. In a machine for welding a pair of arms to a sleeve, a fixed electrode, a power operated electrode, means for retaining one of the arms on the fixed electrode, means holding the sleeve endwise on the arm retained on the fixed electrode and in alignment with the electrodes, and a locator for holding the other arm on the other end of the sleeve, said locator having a spring mounting in a fixed standard to permit movement of the arm under pressure of the electrode during a welding operation.

10. In a machine for resistance welding one end of an arm to one end of a cylindrical member, a stationary electrode, a movable head carrying an electrode in alignment with the stationary electrode, means supporting the member in alignment with the electrodes, and means on which the free end portion of the arm is mounted to locate the other end portion of the arm between the movable electrode and the cylindrical member.

11. In a machine for resistance welding one end of an arm to one end of a cylindrical member, a stationary electrode, a movable head carrying an electrode in alignment with the stationary electrode, means supporting the member in alignment with the electrodes, and floating means on which the free end of the arm is mounted to locate the other end between the movable electrode and an end of the cylindrical member.

12. In a machine for resistance welding one end of an arm to one end of a cylindrical member, a supporting structure, a movable head mounted on the supporting structure, an electrode fixed on the supporting structure, an electrode carried by the head, a locator member movably mounted on the supporting structure for supporting the free end of the arm, and a guide head for the arm fixed to the locator member, said locator and guide head positioning the end of the arm to be welded between the movable electrode and an end of the cylindrical member.

13. In a machine for resistance welding one end of an arm to one end of a cylindrical member, a supporting structure, a head movably mounted on the structure, an electrode carried by the head, an electrode fixed on the structure in alignment with the movable electrode, means locating the cylindrical member between and in axial alignment with the electrodes, a locator member supporting the free end of the arm to align the other arm member between the movable electrode and the cylindrical member, spring means mounted on the supporting structure urging the locator means toward the movable head, and means on the head for clamping the free end of the arm against the locator means.

14. In a machine for resistance welding one end of an arm having openings in the end portions to one end of a cylindrical member, a supporting structure having a base and a head, an electrode movably carried by the head, an electrode fixed to the base, locator means on the fixed electrode piloted in the opening in one end of the arm, locator means for supporting the free end of the arm fixed on the base and piloted in the opening therethrough, and means supporting the cylindrical member endwise on the arm portion above the fixed electrode and in alignment with the movable electrode.

EDMOND J. P. JAMES.